J. G. JUSTIN.

SHELL FOR HIGH EXPLOSIVES.

No. 11,517. Reissued Dec. 10, 1895.

Witnesses

H. A. Earhart

C. B. Kinne

Inventor,

Joel G. Justin.

By his Attorneys

Smith & Denison

THE NORRIS PETERS CO., PHOTO-LITHO., WASHINGTON, D. C.

UNITED STATES PATENT OFFICE.

JOEL G. JUSTIN, OF SYRACUSE, ASSIGNOR, BY MESNE ASSIGNMENTS, TO ORVILLE H. BLACKMAR, OF NEW YORK, N. Y.

SHELL FOR HIGH EXPLOSIVES.

SPECIFICATION forming part of Reissued Letters Patent No. 11,517, dated December 10, 1895.

Original No. 424,482, dated April 1, 1890. Application for reissue filed December 28, 1891. Serial No. 416,390.

*To all whom it may concern:*

Be it known that I, JOEL G. JUSTIN, of Syracuse, in the county of Onondaga, in the State of New York, have invented new and useful Improvements in Shells for High Explosives, of which the following, taken in connection with the accompanying drawings, is a full, clear, and exact description.

My invention relates to the construction of shells designed for firing high explosives from cannon.

My object is to construct a shell capable of carrying heavy charges of dynamite or other high explosive and to furnish such protection from the shock incident to the explosion of the powder as shall prevent the premature explosion of the explosive.

My invention consists in the several novel features of construction and operation hereinafter described, and specifically set forth in the claims annexed.

It is constructed as follows, reference being had to the accompanying drawings, in which—

Figure 1:
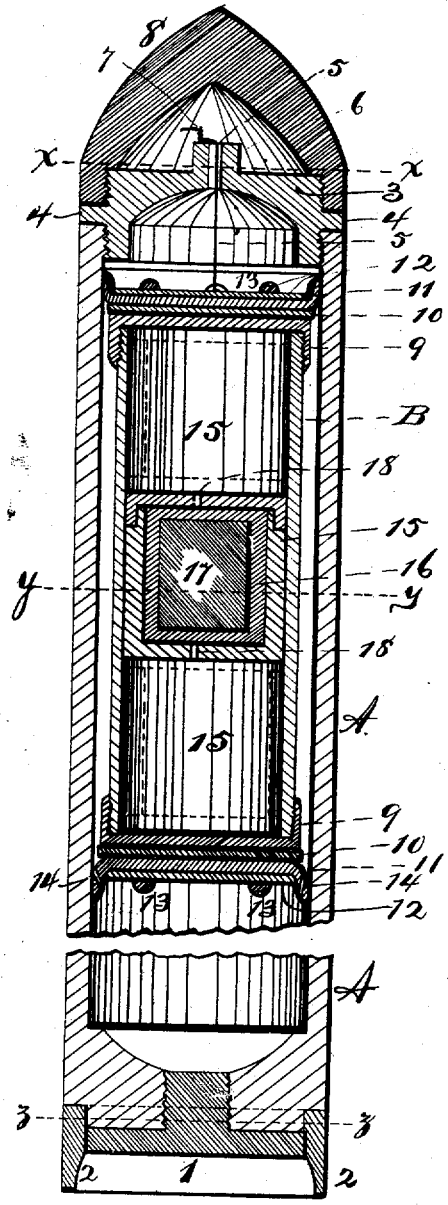
Figure 2:
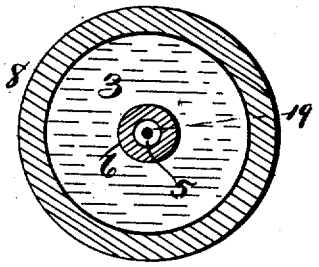
Figure 3:
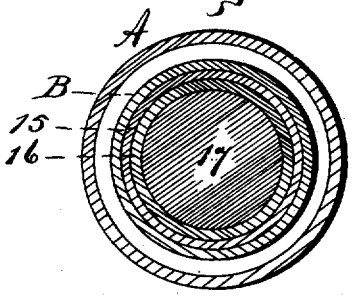
Figure 4:
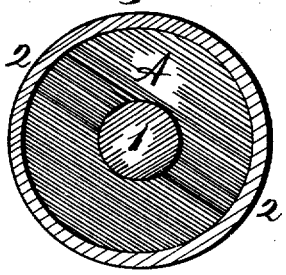

Figure 1 is a longitudinal and sectional elevation of the shell complete. Fig. 2 is a transverse section on line *x x* in Fig. 1. Fig. 3 is a like section on the line *y y*, and Fig. 4 is a like section on line *z z*.

A is the body of the shell of tubular form and thickened adjacent to the breech, substantially as shown, and provided with a breech-piece 1, screwed or otherwise secured in the breech and closing the same. A sabot 2, of soft metal, is cast or otherwise secured upon and around the breech. The front end of the body is closed by the screw-plug 3, which is provided with a peripheral flange 4 and with a central opening 5, opening out through a stud 6, upon the top of which I erect a pin 7. The head of the shell 8 screws or is otherwise secured upon the plug 3, substantially as shown.

Within a body A, I place a cylinder B, closed at the ends by a screw-cap 9, and upon this screw-cap I place an elastic washer 10, and upon this washer I secure the flanged disk 11, of leather or other rather stiff but slightly-elastic material, of greater diameter than the screw-cap and fitting the bore of the body, and anchoring the cylinder B apart from the body and preventing the metallic contact of these cylinders. The washer 10 is of greater diameter than the cap 9 and of less diameter than the disk 11, and operates to reinforce the disk peripherally, in that if the weight of the carrier compresses the valve on one side the edge of the washer at that point will come against the outer shell and afford greater resistance to sagging and weight, and will thus aid in preventing the metallic contact of the two cylinders. A washer 12 is placed upon the disk-body, and these washers and disks are secured together upon the screw-caps by screws 13. The disk 11 upon the rear end of this cylinder is provided with ports 14, opening through the flange into the chamber between the cylinder B and the body.

Within the cylinder B and fitting closely therein, I place the wooden box or boxes 15, consisting of a body and cover, both of wood or other non-vibratory material, the number of boxes varying according to the size of the shell, and according to the quantity of explosives I may desire to use. These boxes are charged with the explosive in substantially the following manner: A layer of "Kieselguhr" or other compressible absorbent is placed in the bottom of the box, then a stick of explosive is cut off to the desired length and placed centrally in the box, and the space between it and the box is filled in with the absorbent, and also the space between the cover and the explosive 17 with the absorbent 16. These boxes, where more than one is used, communicate with each other by means of central openings 18 in the cover and bottom. These openings are closed by securing a disk of paraffine paper over them to prevent leakage into the joint between the ends of the boxes, and outward to the inner surface of the cylinder B. This explosive-carrier is inserted into the front end of the body, the disk-flanges forming a tight joint against the inner surface, and a wire 19 is secured at one end to an eye upon the washer 12, and when the explosive-carrier is drawn up to or against the inner surface of the plug 3 the wire passing through the opening 5 is secured upon the pin 7. This wire suspends the carrier adjacent to the front end of the shell, keeping it in proper position during its storage and while being put into the cannon and up to the time when it receives the impetus of the firing charge of the cannon, and this impetus instantly breaks this wire. Then the body is released, and, moving independently of the carrier, is driven forward, compressing the air column between the breech and the carrier until the inertia of the carrier is overcome, when the body and carrier travel together. The ports 14 operate to transmit the air compression into the chamber around the periphery of the carrier and between the disks, and when this pressure has reached a certain point air will be forced or drawn through between the flange of the forward disk and the inner wall of the body into the chamber in front of the carrier, reducing the vacuum, and, on account of the front disk fitting close, this disk regulates and controls the flow of air from the rear to the front, and thus regulates the backward movement of the carrier until the shell has acquired its full momentum, when the carrier will lie adjacent to or against the breech of the body. During all of this time the periphery of the carrier is surrounded by compressed air and is supported and steadied thereby, and the flange of the rear disk being forced outward against the inner wall of the body its frictional contact is proportioned to the air pressure, and it thus operates as an air-brake to regulate the forward movement of the body.

The open air-chamber around the carrier operates to protect it from the heat of the gunpowder.

The shell itself may be exploded by any ordinary percussion-cap or fuse or other firing device.

What I claim as my invention, and desire to secure by Letters Patent, is—

1. The combination, with the body of the shell, of the explosive carrier cylinder provided with flanged disks secured upon and projecting beyond its ends and fitting the bore of the body, as set forth.

2. The combination, with the body of the shell, of the explosive carrying cylinder provided with flanged disks upon the ends fitting the bore of the body and means for detachably holding the cylinder adjacent to the head of the shell, substantially as described.

3. The combination, with the body of the shell, of an explosive carrying cylinder provided with a solid flanged disk upon its front end, and a flanged valve provided with ports through the flange upon its rear end, substantially as described.

4. The combination, with the body of the shell, and the explosive carrying cylinder, of the elastic washers secured upon the ends of the cylinder and projecting beyond them and the flanged disks secured thereon and projecting beyond the washers and fitting the bore of the shell, as set forth.

5. The combination, with the explosive carrying cylinder, of a series of removable boxes fitting closely within the cylinder and communicating with each other through their ends, and a compressible absorbent packing around the explosives within each box, substantially as described.

6. An explosive carrying cylinder suspended by flanged disks secured upon and beyond its ends fitting the bore of the outer shell body, in combination with the outer shell-body adapted to slide longitudinally over the cylinder and disks, as set forth.

7. The combination, with the body of the shell and the explosive carrying cylinder supported therein by flanged disks secured upon and beyond the ends and fitting the bore of the body, of a series of removable boxes fitting closely within the cylinder and communicating with each other through their ends, and a compressible absorbent packing around the explosives within each box, as set forth.

8. The combination, with the body of the shell, and the explosive carrying cylinder supported therein by flanged disks secured upon and beyond the ends and fitting the bore of the body, and suspended detachably by a cord or wire connected to the head of the shell and to the cylinder, of a series of removable boxes fitting closely within the cylinder and communicating with each other through their ends, and a compressible absorbent packing around the explosives within each box as set forth.

9. The combination, with the body of the shell, the explosive carrying cylinder within it, the elastic washers larger than the cylinder and secured thereon, and the flanged disks larger than said washers and fitting the bore of the body of the shell, of a series of removable boxes fitting closely within the cylinder and communicating with each other through their ends, and a compressible absorbent packing around the explosives within each box, as set forth.

10. The combination, with the body of the shell and the explosive carrying cylinder supported therein by flanged disks fitting the bore of the body and secured upon and beyond the ends of the cylinder, of a series of removable boxes fitting closely within the cylinder and holding the explosive, and communicating with each other through their ends, as set forth.

11. The combination, with the body of the shell, the explosive carrying cylinder supported therein by flanged disks fitting the bore of the body and secured upon and beyond the ends of the cylinder, and a cord or wire detachably connecting the cylinder to the shell-body, of a series of removable boxes fitting closely within the cylinder and holding the explosive, and communicating with each other through their ends, as set forth.

12. The combination, with the body of the shell, of the explosive carrying cylinder, the washers secured upon the ends thereof and projecting beyond their peripheries, the flanged disks secured upon the ends of the cylinder exterior to and projecting beyond the washers to fill the bore of the body, a cord or wire detachably connecting the cylinder to the body, and a series of removable boxes fitting closely within the cylinder and carrying the explosive, and communicating with each other through their ends, as set forth.

13. A shell comprising a body, a carrier movably supported against said body with unobstructed air-chambers between the supports and the carrier and the shell-body, whereby the rotary movement of the shell is not imparted to the carrier, and the carrier can reciprocate lengthwise within the shell.

14. An outer shell body, and an explosive carrier within the same, having no fixed connection thereto, constructed, combined and adapted to move independently relative to each other, both when the shell is fired, and its flight is arrested, and means whereby air may pass within the shell body and between it and the carrier, substantially as specified.

15. An outer shell body, and an explosive carrier within the same, having no fixed connection thereto, constructed, combined and adapted to move independently relative to each other, both when the shell is fired, and its flight is arrested, and means for detachably holding the carrier adjacent to the head of the shell, substantially as described.

Witness my hand this 11th day of November, 1891.

JOEL G. JUSTIN.

In presence of—
C. W. SMITH,
HOWARD P. DENISON.